(12) United States Patent
Colombo et al.

(10) Patent No.: US 8,845,227 B2
(45) Date of Patent: Sep. 30, 2014

(54) FASTENING ASSEMBLY

(75) Inventors: Dario Colombo, Uboldo (IT); Giuseppe Gasparini, Gallarate (IT); Francesco Ferretti, Brebbia (IT)

(73) Assignee: Agustawestland S.p.A, Samarate (IT)

( * ) Notice: Subject to any disclaimer, the term of this patent is extended or adjusted under 35 U.S.C. 154(b) by 104 days.

(21) Appl. No.: 13/327,026

(22) Filed: Dec. 15, 2011

(65) Prior Publication Data

US 2012/0155957 A1    Jun. 21, 2012

(30) Foreign Application Priority Data

Dec. 15, 2010  (EP) .................................... 10425385

(51) Int. Cl.
*F16B 21/02*    (2006.01)
(52) U.S. Cl.
CPC ..................... *F16B 21/02* (2013.01)
USPC .......................................... 403/348; 403/349
(58) Field of Classification Search
USPC .......... 403/348, 349, 350; 411/349, 549, 552, 411/553
See application file for complete search history.

(56) References Cited

U.S. PATENT DOCUMENTS

| | | | | |
|---|---|---|---|---|
| 2,763,908 | A | * | 9/1956 | Marschner ..................... 411/552 |
| 3,232,644 | A | * | 2/1966 | Pfeifer et al. .................. 403/348 |
| 3,334,661 | A | * | 8/1967 | Milette ............................ 138/89 |
| 4,756,638 | A | * | 7/1988 | Neyret ........................... 403/349 |
| 5,249,760 | A | * | 10/1993 | Morimoto ..................... 403/348 |
| 5,261,758 | A | * | 11/1993 | Vranish ......................... 403/348 |
| 5,718,070 | A | * | 2/1998 | Ruvang ........................... 37/459 |
| 6,322,284 | B1 | * | 11/2001 | Bonardo et al. ............... 403/348 |
| 7,707,755 | B2 | * | 5/2010 | Lopez Almendros et al. ............................. 411/549 |
| 2008/0284558 | A1 | * | 11/2008 | Scheiber et al. ............... 337/401 |
| 2010/0284767 | A1 | * | 11/2010 | Shue .............................. 411/553 |

FOREIGN PATENT DOCUMENTS

DE         296 14 444 U1     12/1997
DE     20 2006 017 664 U1     4/2007

OTHER PUBLICATIONS

European Search Report dated May 26, 2011 for corresponding European Patent Application No. EP 10425385.

* cited by examiner

*Primary Examiner* — Michael P Ferguson
(74) *Attorney, Agent, or Firm* — Ohlandt Greeley Ruggiero & Perle L.L.P (57) ABSTRACT

A fastening assembly having a tubular first coupling member; a second coupling member insertable coaxially inside the first coupling member in a first direction; and releasable fastening means for locking the first and second coupling member to each other in a predetermined axial lock position. The fastening means include: first and second engaging means formed on the first and second coupling member, connectable to each other to define a foolproof angular insertion/release position, and releasable by positioning the second coupling member in a predetermined axial position inside the first coupling member; and third and fourth engaging means formed on the first and second coupling member and connectable to each other in a further angular position of the second coupling member, different from the angular insertion/release position, by moving the second coupling member axially, from the predetermined axial position, in a second direction opposite the first direction.

5 Claims, 10 Drawing Sheets

FASTENING ASSEMBLY

The present invention relates to a fastening assembly, in particular for aircraft applications.

BACKGROUND OF THE INVENTION

As is known, bolts, screws and retaining rings are normally used for locking and securing two or more coupling members.

Fastening systems of this sort invariably require special tools for installation and removal.

In aircraft applications, in which weight reduction is an important issue, they also have the drawback of requiring parts in addition to the coupling members. And, in some cases, as when screwing or bolting together cylindrical coupling members, these must be provided with annular flanges with holes for the screws and bolts.

Lastly, when using steel retaining rings cooperating with aluminium or magnesium coupling members, galvanically-induced corrosion phenomena may arise.

SUMMARY OF THE INVENTION

It is an object of the present invention to provide a fastening assembly which is reliable, easy to install and remove, and designed to provide a simple, low-cost solution to the drawbacks typically associated with known fastening systems of the type described above.

BRIEF DESCRIPTION OF THE DRAWINGS

Two preferred, non-limiting embodiments of the present invention will be described by way of example with reference to the accompanying drawings, in which.

DETAILED DESCRIPTION OF THE INVENTION

Number 1 in FIGS. 1 to 5 indicates as a whole a seal unit, for a shaft 2 of axis A, featuring a fastening assembly 3, also of axis A, in accordance with the teachings of the present invention.

Fastening assembly 3 serves to lock an annular seal 4 in a predetermined axial position on shaft 2.

More specifically, fastening assembly 3 substantially comprises a tubular first coupling member 5 of axis A; a tubular second coupling member 6, also of axis A, insertable coaxially inside coupling member 5 in an insertion direction B coincident with axis A; and releasable fastening means 7 for locking coupling members 5 and 6 to each other in a predetermined angular and axial lock position.

More specifically, coupling member 5 defines a seat for shaft 2, seal 4, and coupling member 6; and coupling member 6 defines a seat 9 for loosely housing shaft 2, is interposed radially, in use, between shaft 2 and coupling member 5, and is fitted internally with seal 4, which projects to cooperate with an outer lateral surface 10 of shaft 2.

Coupling member 5 has a cylindrical lateral wall 11, of axis A, which at opposite ends has respective raised edges 12, 13 projecting radially inwards. More specifically, edge 12 is the one first encountered by coupling member 6 as it is inserted inside coupling member 5 in direction B.

Coupling member 6 also has a substantially cylindrical lateral wall 14, of axis A, which, close to its axial end 15 inserted first inside coupling member 5 in direction B, has an inner annular groove 16 engaged by seal 4, and an outer annular groove 20 engaged by an O-ring 21.

At its axial end 22 opposite axial end 15, lateral wall 14 of coupling member 6 has two keys 23 projecting outwards on diametrically opposite sides of axis A.

Each key 23 extends from an outer lateral surface 24 of lateral wall 14, and comprises a first portion 25 in the form of a curved plate; and a second portion 26, also in the form of a plate, which lies radially and angularly within the contour of portion 25, and is located upstream from portion 25 in direction B. More specifically, and as shown clearly in FIGS. 1 and 5, portion 26 of each key 23 projects in a direction parallel to axis A from the face of relative portion 25 opposite that facing axial end 15.

Figure 1:
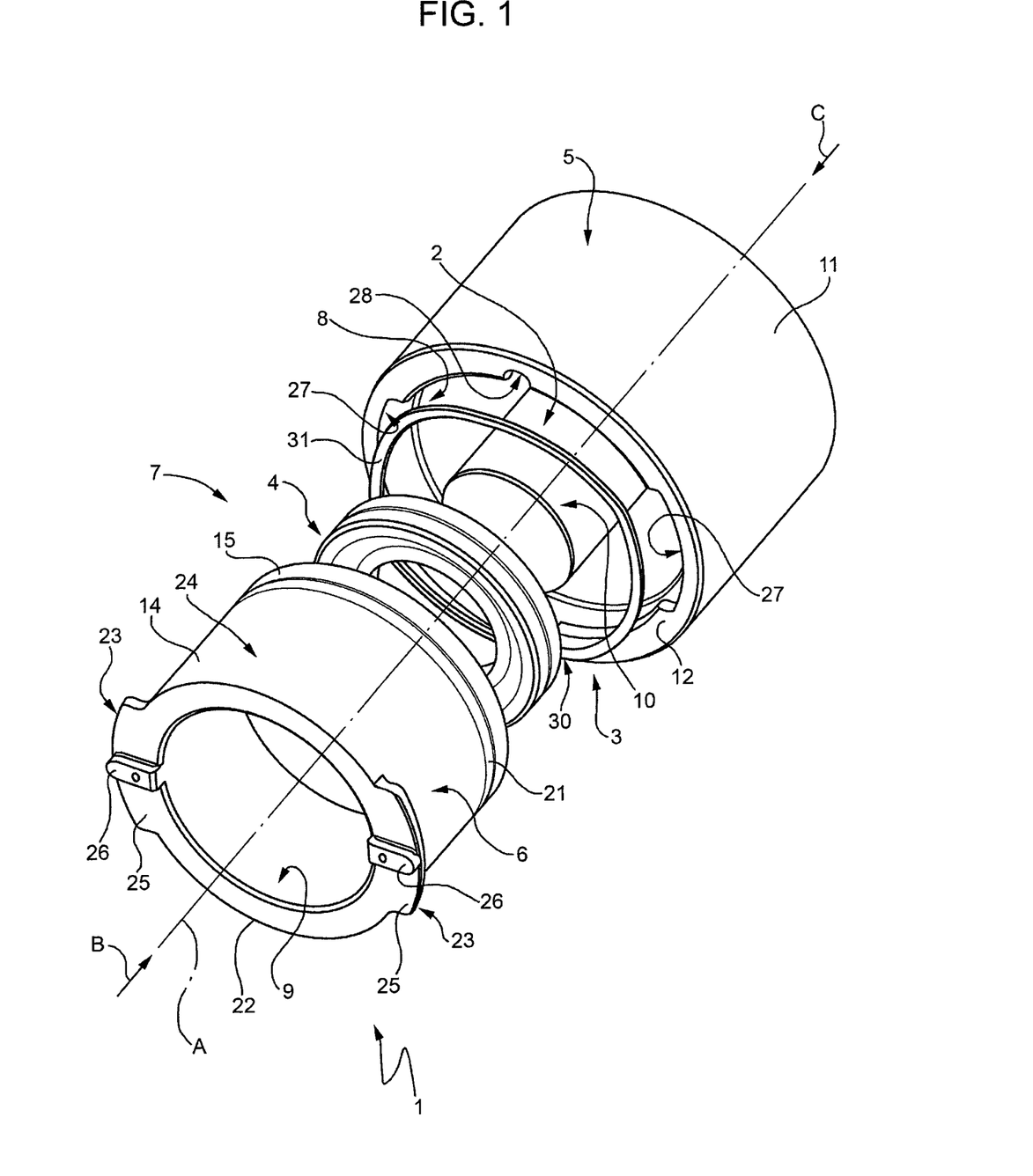
FIG. 1 shows an exploded view in perspective of a rotary shaft seal unit featuring a fastening assembly in accordance with the teachings of the present invention and comprising a first and second coupling member.
Figure 2:
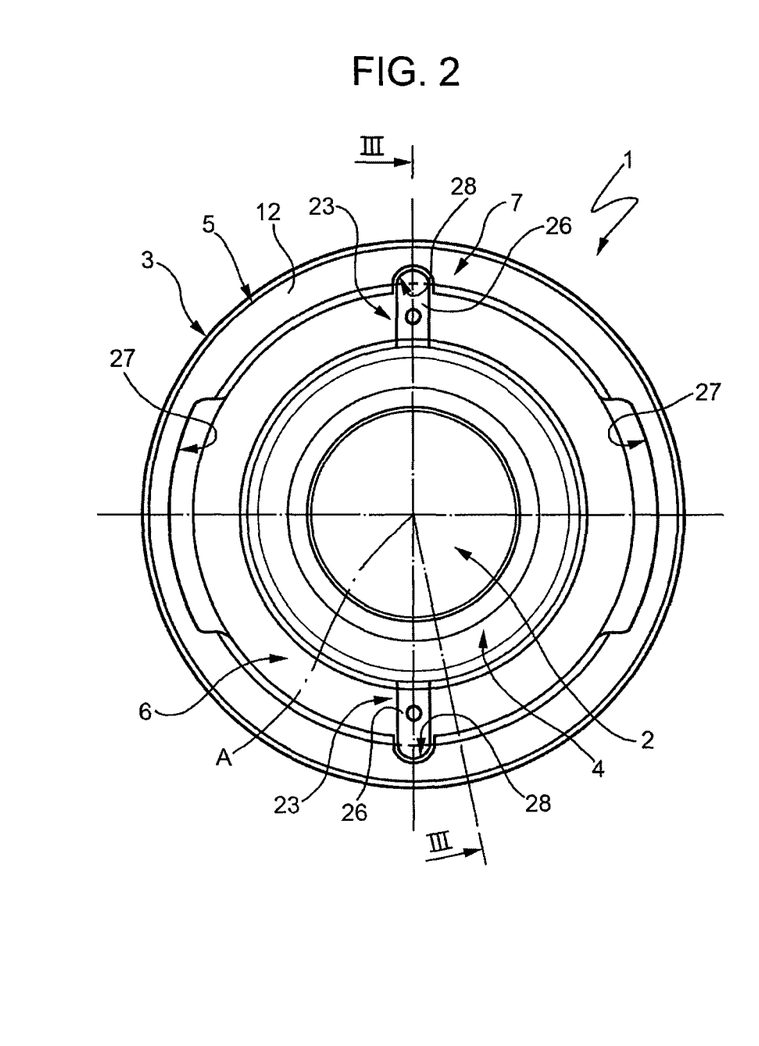
FIG. 2 shows a larger-scale front view of the FIG. 1 unit, with the first and second coupling member in a final angular and axial lock position.
Figure 3:
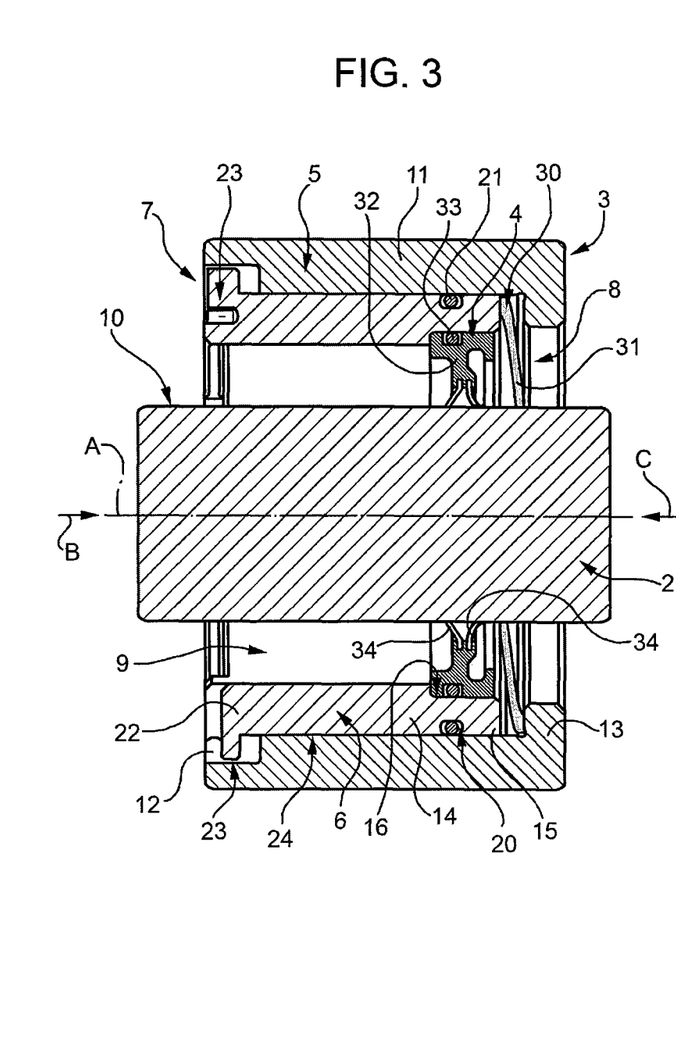
FIG. 3 shows a section along line III-III in FIG. 2.
Figure 5:
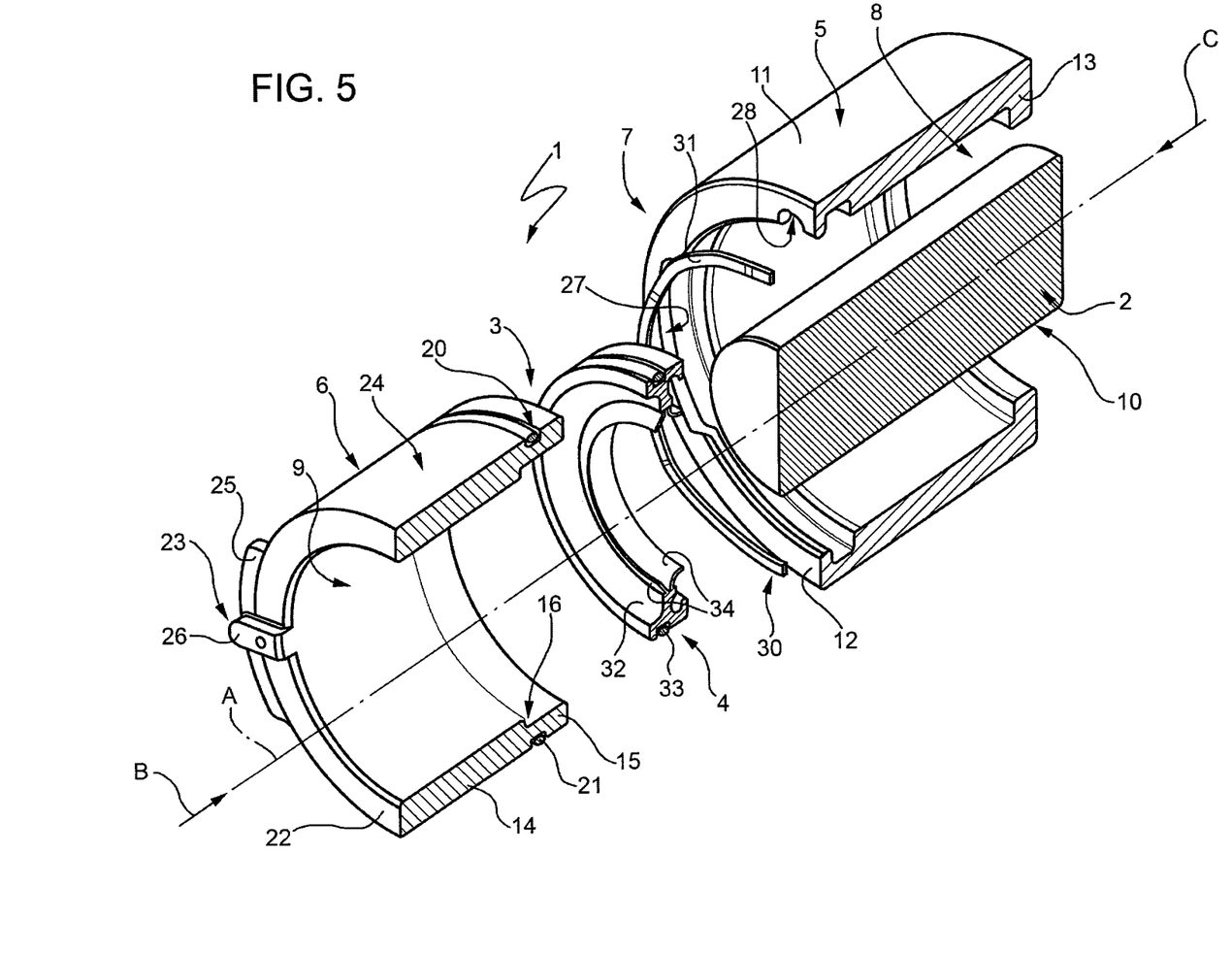
FIG. 5 shows an exploded sectioned view in perspective of the FIG. 1 unit.

In the example shown, each portion 25 extends roughly 60° about axis A, and is roughly 6 times the angular extension of relative portion 26. The angular extensions shown of both portions 25 and 26, however, are obviously not binding.

Edge 12 of coupling member 5 has two contoured recesses 27 located on diametrically opposite sides of axis A and complementary in shape to portions 25 of respective keys 23.

Edge 12 of coupling member 5 also has a further two contoured recesses 28 located on diametrically opposite sides of axis A, complementary in shape to portions 26 of respective keys 23, and spaced angularly apart from respective recesses 27.

In the example shown, recesses 28 are aligned along a diameter of edge 12 of coupling member 5 perpendicular to the diameter along which recesses 27 are aligned.

In actual use, portions 25 of respective keys 23 engage recesses 27 to define a foolproof angular position in which to insert coupling member 6 inside coupling member 5, or to release coupling members 5 and 6. Recesses 27 and portions 25 of respective keys 23 are releasable by moving coupling member 6 into a predetermined axial position inside coupling member 5. In the example shown, the predetermined axial position, hereinafter referred to as the limit axial position, is defined by insertion of keys 23 past edge 12 of coupling member 5 when inserting coupling member 6 inside coupling member 5. In other words, in the limit axial position, keys 23 of coupling member 6 are positioned beyond edge 12 of coupling member 5 and towards edge 13.

Portions 26 of respective keys 23 engage recesses in a further angular position, different from the angular insertion/ release position, of coupling member 6, by moving coupling member 6 axially, from the limit axial position, in a locking direction C opposite direction B, so as to define the lock position of coupling members 5 and 6.

Fastening assembly 3 also comprises elastic means 30 interposed between edge 13 of coupling member 5 and axial end 15 of coupling member 6, and which exert thrust on coupling member 6 in direction C. When coupling member 6 is in the angular position in which portions 26 of keys 23 engage respective recesses 28 of coupling member 5, edge 12 defines an axial stop for portions 25 of keys 23 of coupling member 6 pushed in direction C by elastic means 30.

In the example shown, elastic means 30 comprise a non-flat, undulated annular elastic member 31.

Figure 4:
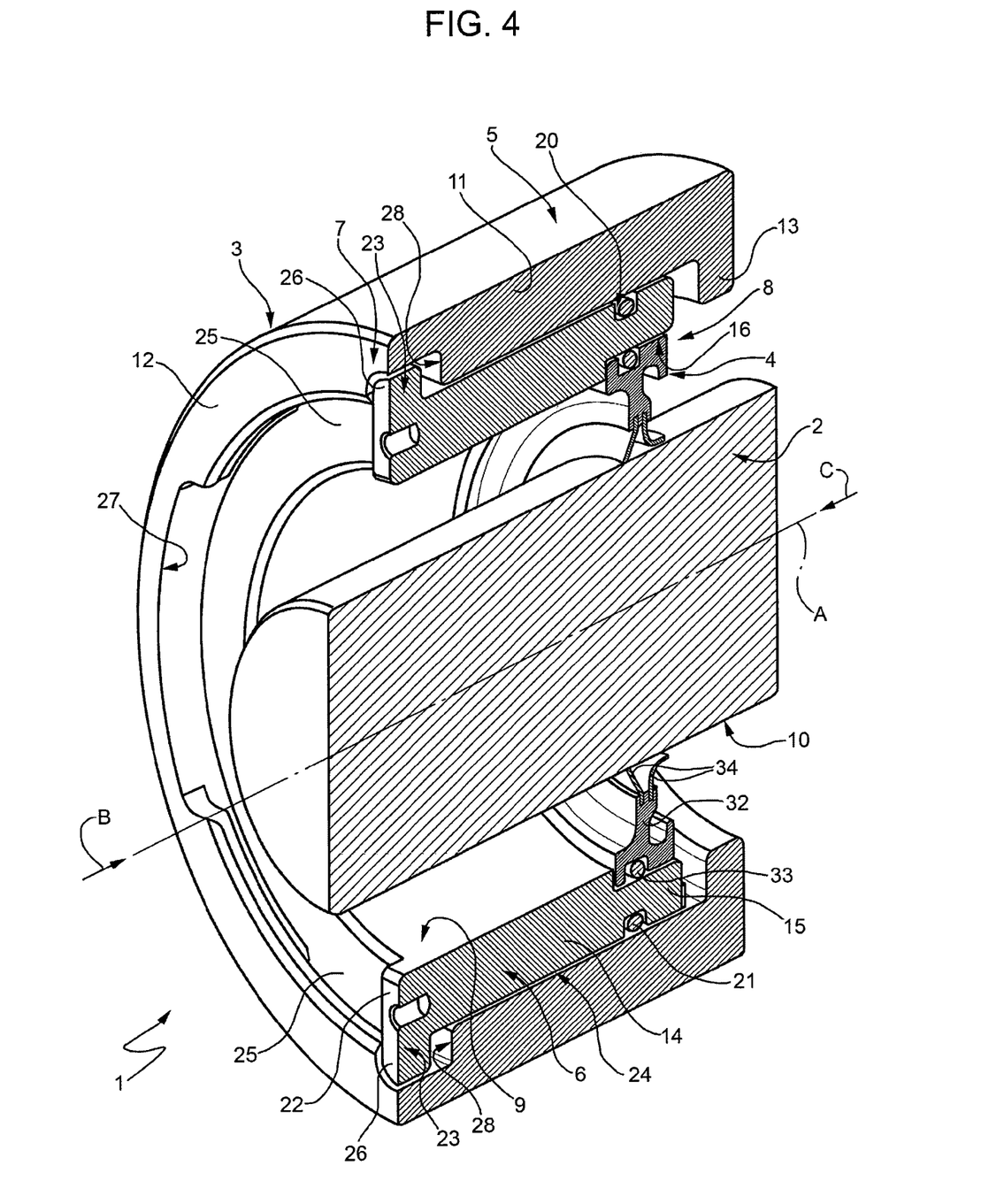
FIG. 4 shows a larger-scale sectioned view in perspective of the FIGS. 2 and 3 unit.

With particular reference to FIGS. 4 and 5, seal 4 comprises an annular body 32 which partly engages inner groove 16 in lateral wall 14 of coupling member 6 with the interposition of an O-ring 33; and two annular sealing lips 34 projecting from an inner circumferential edge of annular body 32, and which cooperate with outer lateral surface 10 of shaft 2.

Unit 1 is assembled as described below, from an initial configuration in which shaft 2 loosely engages seat 8 of coupling member 5; coupling member 6 is outside coupling member 5; seal 4 is fitted inside inner annular groove 16 of coupling member 6; and elastic member 31 is fitted inside coupling member 5, resting against edge 13.

At this point, coupling member 6 is moved in direction B into the angular insertion/release position, in which keys 23 are aligned axially with respective recesses 27; and coupling member 6 is inserted inside coupling member 5, until the outer edges of portions 25 slide along the edges of respective recesses 27, and elastic member 31 is compressed.

Insertion is terminated when keys 23 are inserted completely past edge 12 of coupling member 5, i.e. when coupling member 6 reaches the limit axial position inside coupling member 5.

At this point, coupling member 6 is rotated about axis A into the angular position in which portions 26 of keys 23 are aligned axially with respective recesses 28. When released by the fitter, coupling member 6 is pushed axially in direction C by elastic member 31, so that portions 26 of keys 23 engage respective recesses 28, and portions 25 are pushed against the portions of edge 12 adjacent to recesses 28.

Unit 1 can be disassembled easily, with no tools required, by simply pressing coupling member 6 axially in direction B in opposition to elastic member 31, to restore keys 23 to the limit axial position beneath edge 12 of coupling member 5.

At this point, coupling member 6 is rotated about axis A into the angular insertion/release position, in which portions 25 of keys 23 are aligned axially with respective recesses 27.

In this case, too, when released by the fitter, coupling member 6 is pushed partly outwards by elastic member 31, so that portions 25 of respective keys 23 engage recesses 27.

Number 1' in FIGS. 6 to 9 indicate as a whole a cap unit, for a known aircraft oil filler (not shown), featuring a fastening assembly 3' in accordance with a different embodiment of the present invention.

Unit 1' substantially comprises a receiving member 40 defining a through oilflow seat 41; and a cap 42 which fits releasably to receiving member 40 to seal seat 41.

In this case, fastening assembly 3' serves to lock cap 42 in a position sealing seat 41.

As described with reference to unit 1, fastening assembly 3' substantially comprises a tubular first coupling member 5' of axis A; a tubular second coupling member 6', also of axis A, insertable coaxially inside coupling member 5' in an insertion direction B coincident with axis A; and releasable fastening means 7' for locking coupling members 5' and 6' to each other in a predetermined angular and axial lock position.

Figure 7:
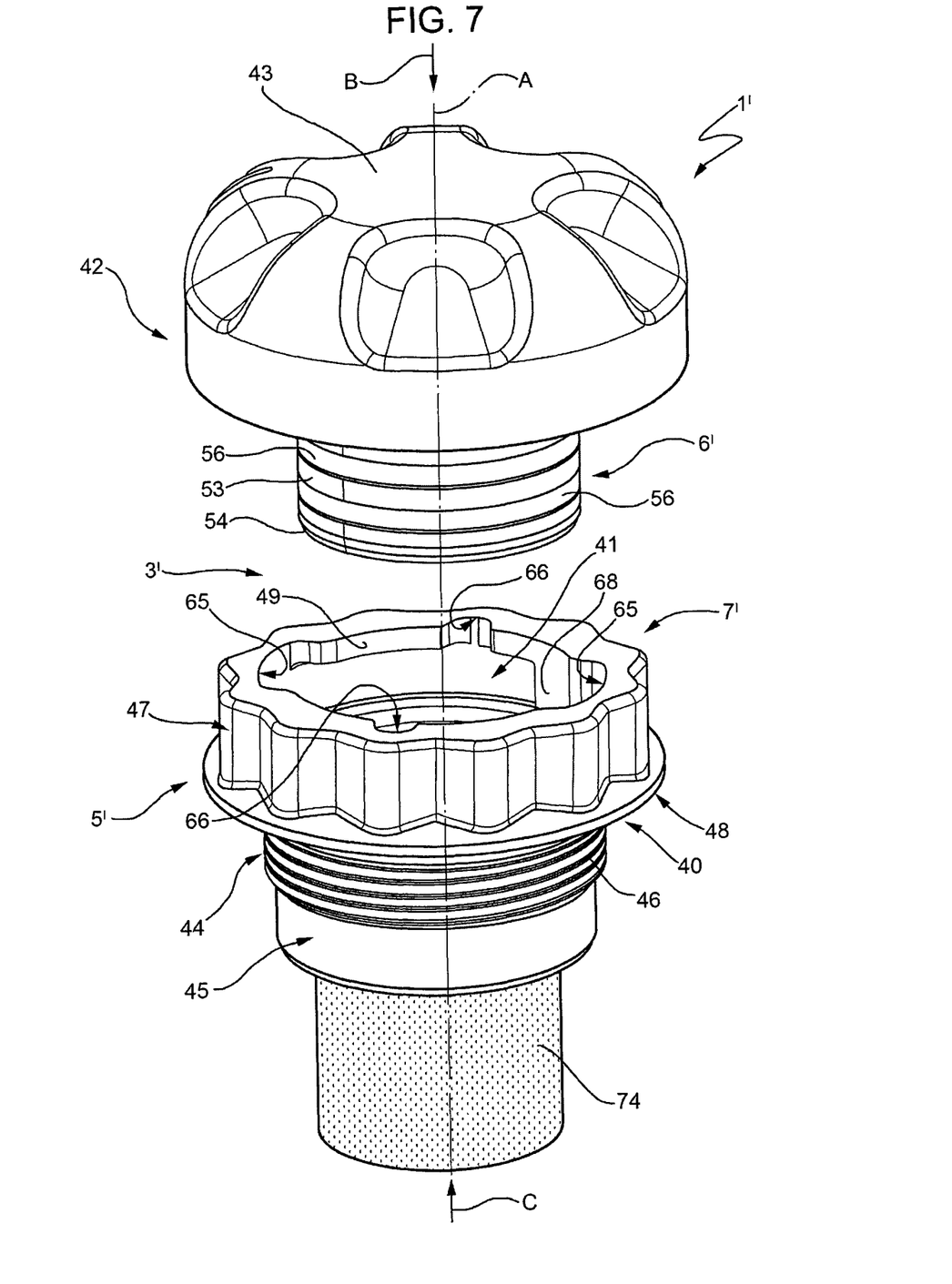
FIG. 7 shows a view in perspective of the FIG. 6 unit when open.
Figure 8:
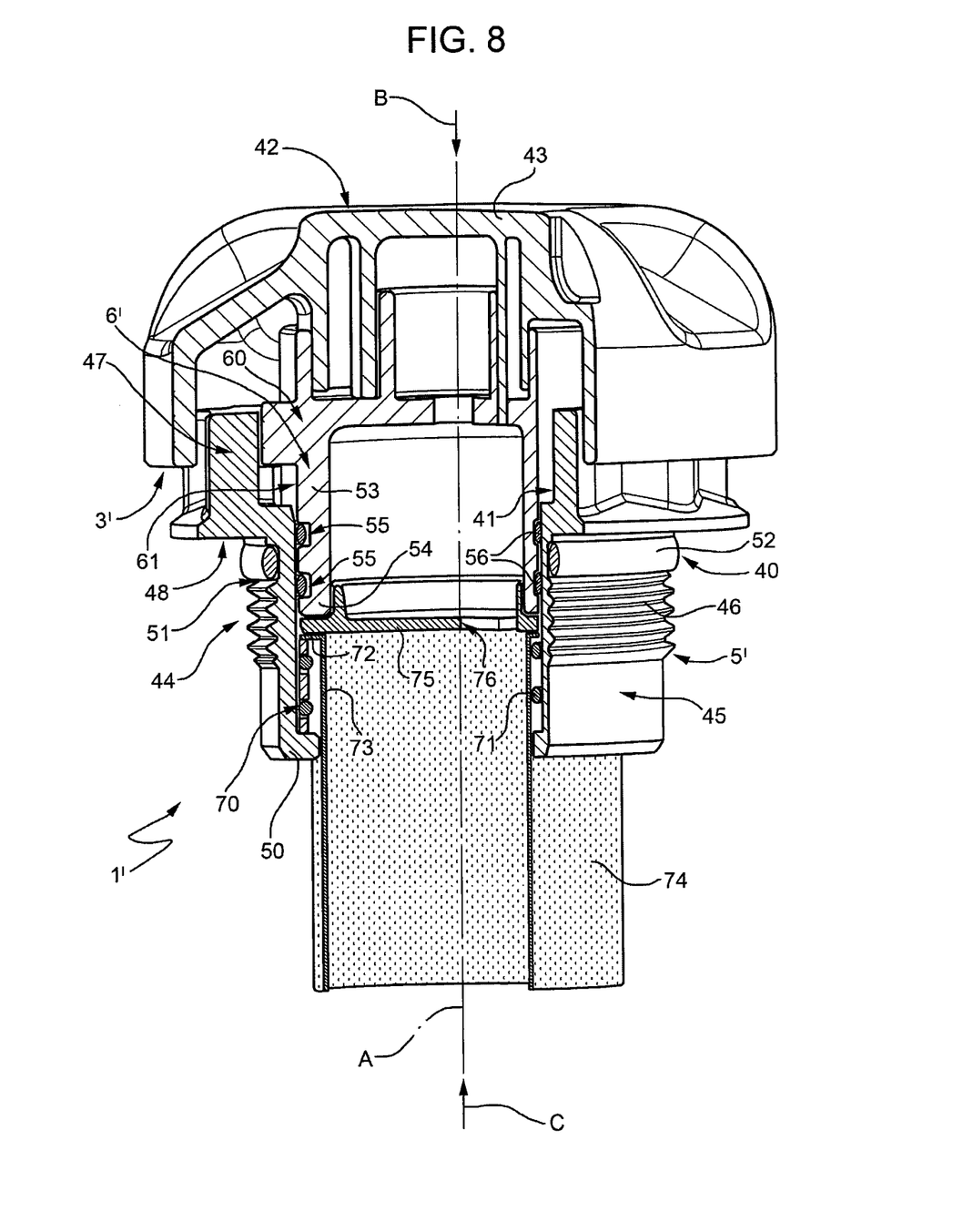
FIG. 8 shows a partly sectioned side view of the FIG. 6 unit.
Figure 9:
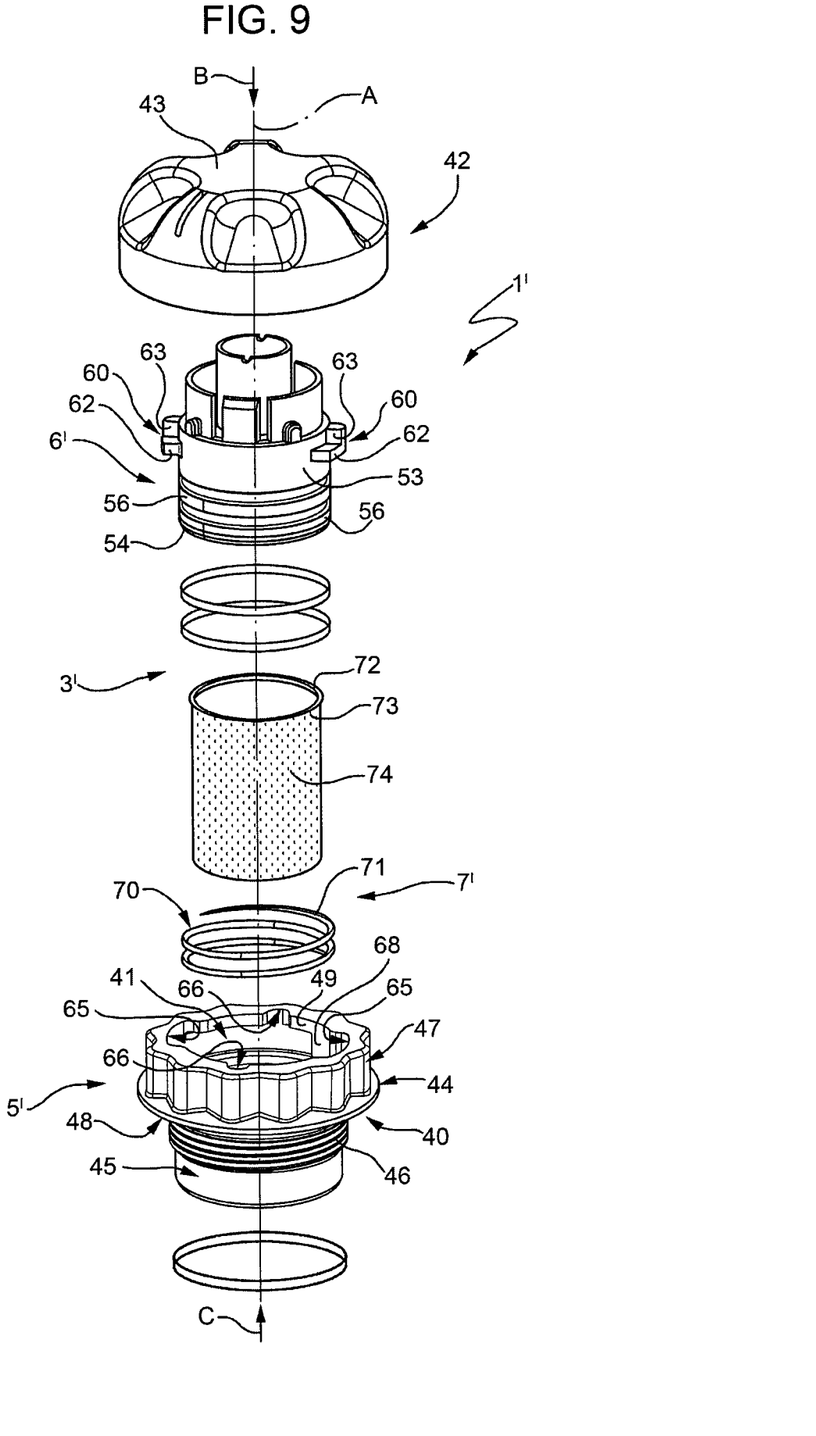
FIG. 9 shows a smaller-scale exploded view in perspective of the FIG. 6 unit.

In the example shown, coupling member 5' is defined by receiving member 40, and coupling member 6' by a stem of cap 42. As shown in FIGS. 7 to 9, cap 42 also comprises a head portion 43 fixed releasably to and projecting radially from the stem or coupling member 6'.

Coupling member 5' (FIGS. 6, 7, 8, 9, 12) comprises a lateral wall 44, of axis A, defined by a cylindrical first portion 45 with a threaded portion 46 for connection to another component part (not shown) of the filler; and by a roughly cylindrical second portion 47, which has an undulated outer edge, is larger in diameter than portion 45, and is connected to portion 45 by an annular shoulder 48.

At opposite ends, lateral wall 44 has respective raised edges 49, 50 projecting radially inwards. More specifically, edge 49 is the one first encountered by coupling member 6' as it is inserted inside coupling member 5' in direction B.

Between shoulder 48 and threaded portion 46, the outer surface of portion 45 of lateral wall 44 has an annular groove 51 engaged by an O-ring 52.

Figure 10:
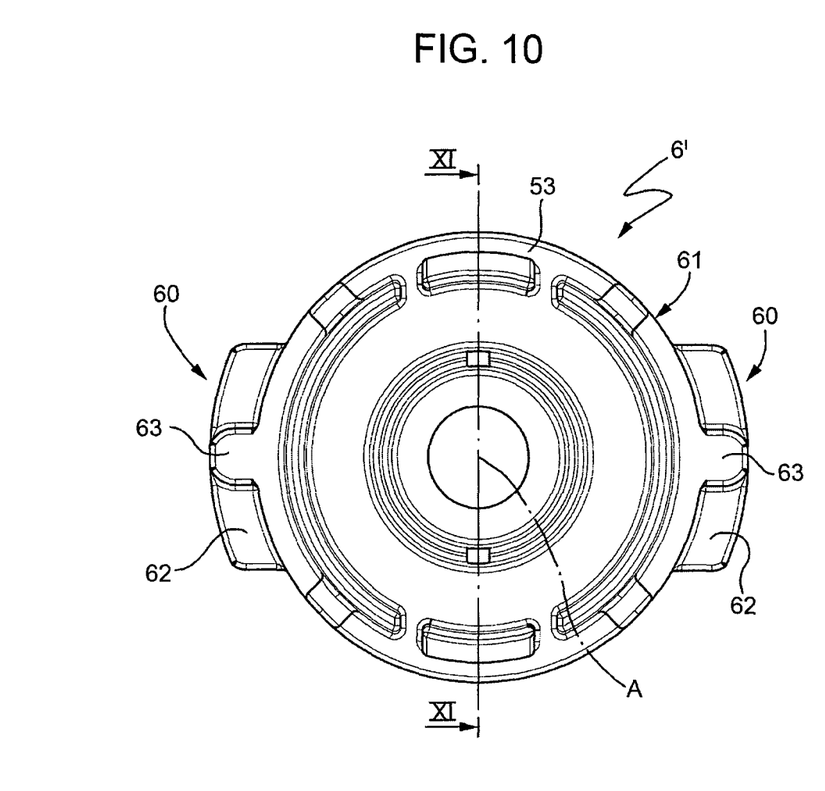
FIG. 10 shows a front view of a coupling member of the FIG. 6 unit.
Figure 11:
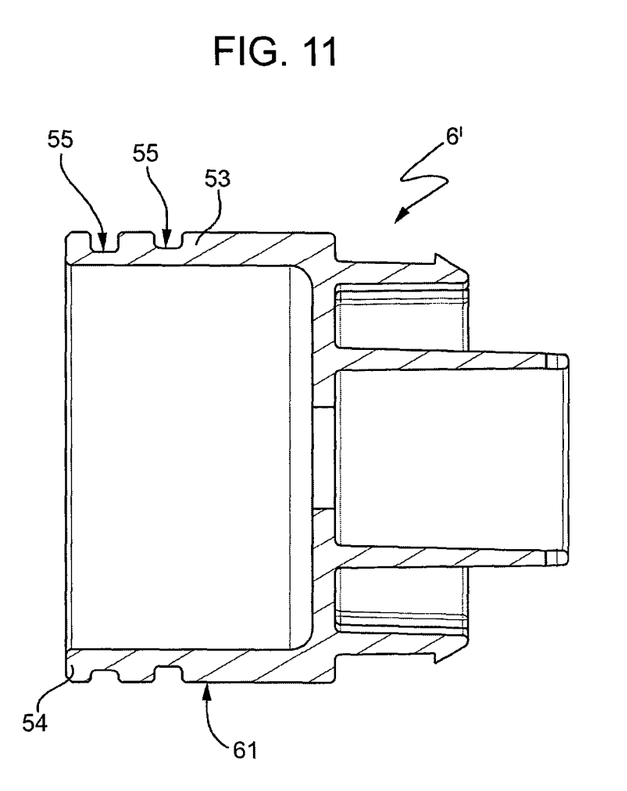
FIG. 11 shows a section along line XI-XI in FIG. 10.

Coupling member 6' has a substantially cylindrical lateral wall 53, of axis A, which, close to its axial end 54 opposite head portion 43, has two outer annular grooves 55 spaced axially apart and engaged by respective O-rings 56.

Where it attaches to head portion 43, lateral wall of coupling member 6' has two keys 60 projecting outwards on diametrically opposite sides of axis A.

More specifically, each key 60 projects from an outer lateral surface 61 of lateral wall 53, and comprises a first portion 62 in the form of a curved plate; and a second portion 63, also in the form of a plate, which lies radially and angularly within the contour of portion 62, and is located upstream from portion 62 in direction B. More specifically, and as shown clearly in FIGS. 9 and 10, portion 63 of each key 60 projects in a direction parallel to axis A from the face of relative portion 62 opposite that facing axial end 54.

In the example shown, each portion 62 extends roughly 60° about axis A, and is roughly 6 times the angular extension of relative portion 63. The angular extensions shown of both portions 62 and 63, however, are obviously not binding.

Figure 12:
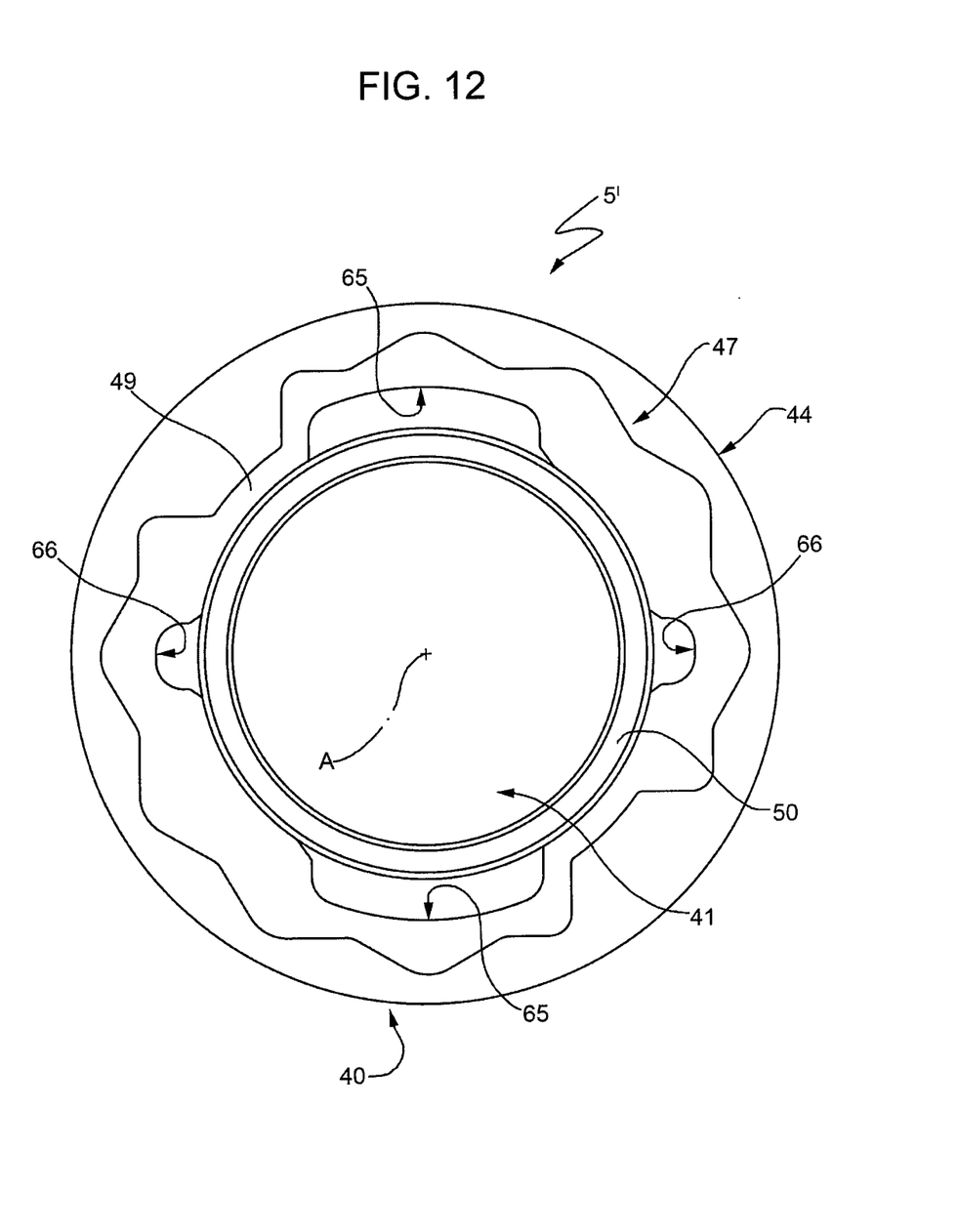
FIG. 12 shows a larger-scale front view of another coupling member of the FIG. 6 unit.

Edge 49 of coupling member 5' has two contoured recesses 65 located on diametrically opposite sides of axis A and complementary in shape to portions 62 of respective keys 60.

Edge 49 of coupling member 5' also has a further two contoured recesses 66 located on diametrically opposite sides of axis A, complementary in shape to portions 63 of respective keys 60, and spaced angularly apart from respective recesses 65.

In the example shown, recesses 66 are aligned along a diameter of edge 49 of coupling member 5' perpendicular to the diameter along which recesses 65 are aligned.

In actual use, portions 62 of respective keys 60 engage recesses 65 to define a foolproof angular position in which to insert coupling member 6' inside coupling member 5', or to release coupling members 5' and 6'. Recesses 65 and portions 62 of respective keys 60 are releasable by moving coupling member 6' into a predetermined axial position inside coupling member 5'. In the example shown, the predetermined axial position, hereinafter referred to as the limit axial position, is defined by insertion of keys 60 past edge 49 of coupling member 5' when inserting coupling member 6' inside coupling member 5'. In other words, in the limit axial position, keys 60 of coupling member 6' are positioned beyond edge 49 of coupling member 5' and towards edge 50.

Portions 63 of respective keys 60 engage recesses 66 in a further angular position, different from the angular insertion/release position, of coupling member 6', by moving coupling member 6' axially, from the limit axial position, in a locking direction C opposite direction B, so as to define the lock position of coupling members 5' and 6'.

The further angular position of coupling member 6' is defined by portion 62 of each key 60 rotating onto a respective stop portion 68 (FIG. 6) formed inside seat 41 of coupling member 5' and extending from edge 49 to portion 45 of lateral wall 44.

A similar stop arrangement is also provided in coupling member 5 of fastening assembly 3, but is not visible in FIGS. 1 to 5.

Fastening assembly 3' also comprises elastic means 70, which exert thrust on coupling member 6' in direction C. When coupling member 6' is in the angular position in which portions 63 of keys 60 engage respective recesses 66 of coupling member 5', edge 49 defines an axial stop for portions 62 of keys 60 of coupling member 6' pushed in direction C by elastic means 70.

In the example shown, elastic means 70 comprise a cylindrical coil spring 71 housed in portion 45 of lateral wall 44 of coupling member 5' and interposed between edge 50 and coupling member 6'.

More specifically, portion 45 of lateral wall 44 is engaged axially by an axial end portion 73 of a cylindrical filter 74 of the oil filler, so spring 71 is interposed between edge 50 of lateral wall 44 and a raised edge 72 projecting radially outwards from end portion 73 of filter 74. As shown, particularly in FIG. 8, a plate 75, with a number of through openings 76 equally spaced about axis A, is interposed axially between end portion 73 of filter 74 and axial end 54 of coupling member 6'.

Figure 6:
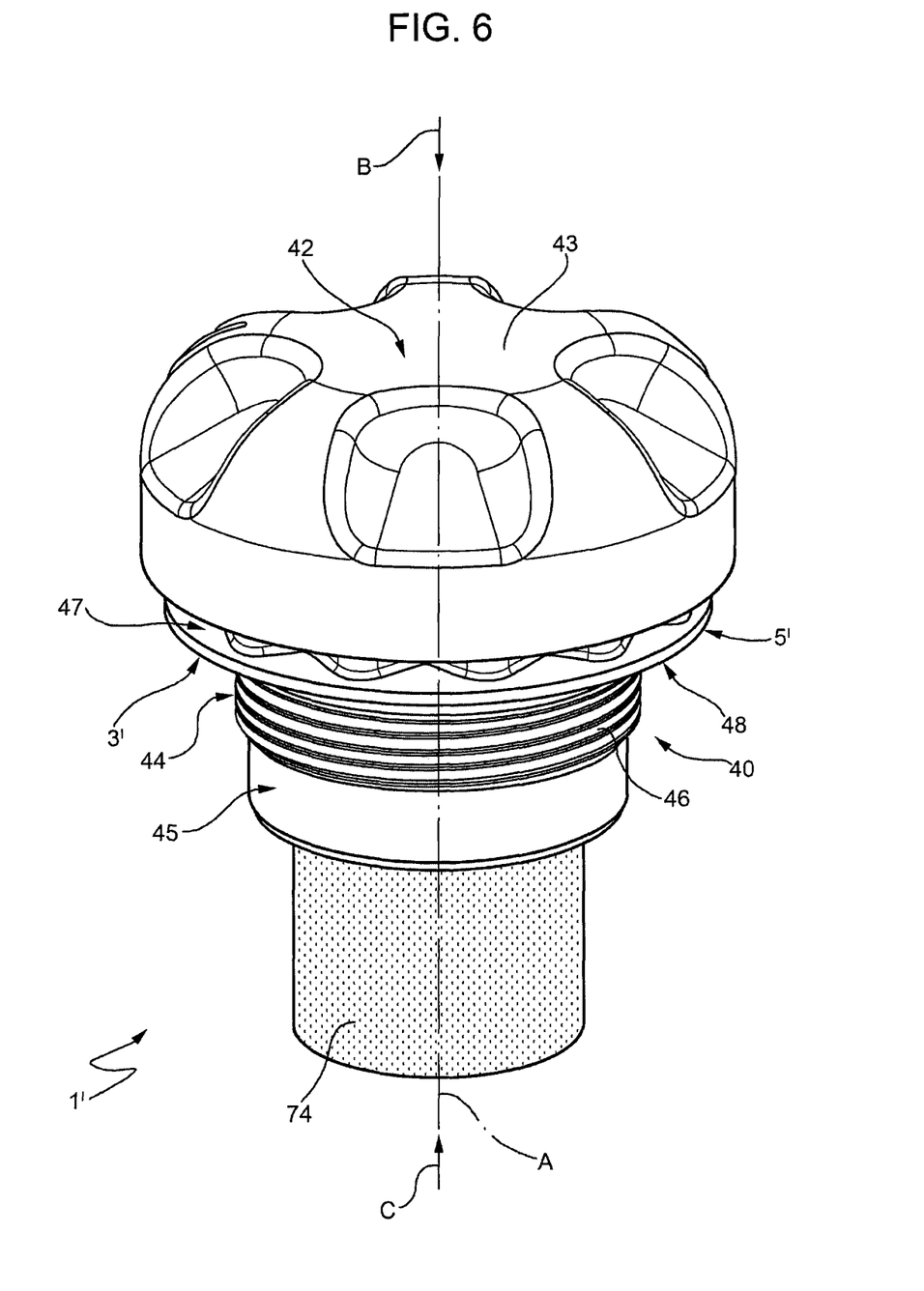
FIG. 6 shows a view in perspective of an aircraft oil filler cap unit featuring a fastening assembly in accordance with the teachings of the present invention.

In actual use, cap 42 is fitted to receiving member 40 to seal seat 41 as described below.

Firstly, cap 42 and therefore coupling member 6' are moved in direction B into the angular insertion/release position, in which keys 60 are aligned axially with respective recesses 65; and coupling member 6' is inserted inside coupling member 5', until the outer edges of portions 62 slide along the edges of respective recesses 65, and elastic member 71 is compressed.

Insertion is terminated when keys 60 are inserted completely past edge 49 of coupling member 5', i.e. when coupling member 6' reaches the limit axial position inside coupling member 5'.

At this point, coupling member 6' is rotated about axis A into the angular position in which portions 63 of keys 60 are aligned axially with respective recesses 66, and which is defined by portions 62 of keys 60 rotating (clockwise in FIG. 6) onto respective stop portions 68 of coupling member 5'. When released by the fitter, coupling member 6' is pushed axially in direction C by elastic member 71, so that portions 63 of keys 60 engage respective recesses 66, and portions 62 are pushed against the portions of edge 49 adjacent to recesses 66.

Unit 1' can be opened easily by simply pressing coupling member 6' axially in direction B in opposition to elastic member 71, to restore keys 60 to the limit axial position beneath edge 49 of coupling member 5'.

At this point, coupling member 6' is rotated about axis A into the angular insertion/release position, in which portions 62 of keys 60 are aligned axially with respective recesses 65.

When released by the fitter, coupling member 6' is pushed partly outwards by elastic member 71, so that portions 62 of respective keys 60 engage recesses 65.

The advantages of fastening assemblies 3, 3' according to the present invention will be clear from the above description.

In particular, they provide for safely locking in the desired position and releasing coupling members 5, 6 and 5', 6' with no need for additional parts or special tools, such as wrenches, screwdrivers, pliers, etc, thus greatly simplifying locking and release, while still maintaining the same degree of safety.

Moreover, the overall weight of fastening assemblies 3, 3' is reduced as compared with known solutions of the same size.

Finally, fastening assemblies 3, 3' described provide for eliminating galvanically-induced corrosion phenomena.

Clearly, changes may be made to fastening assemblies 3, 3' as described and illustrated herein without, however, departing from the protective scope defined in the accompanying Claims.

The invention claimed is:

1. A fastening assembly having a longitudinal axis, and comprising a tubular first coupling member coaxial with said axis, a second tubular coupling member insertable coaxially and at least partly inside said tubular first coupling member in a first direction, at least one sealing element interposed between an inner surface of said tubular first coupling member and an outer surface of said second coupling member, and fastening means that are releasable for locking said tubular first coupling member and said second coupling member to each other in a predetermined angular and axial lock position; said fastening means comprising:

a first and a second engaging element, which are carried by said tubular first coupling member and said second coupling member, respectively, that are complementary in shape to engage with each other to define An angular insertion/release position in which to insert/release said second coupling member into/from said tubular first coupling member, and are releasable as a result of the positioning of said second coupling member in a predetermined axial position inside the tubular first coupling member; and a third and a fourth engaging element, which are carried by said first and second coupling member respectively, are complementary in shape, and are connectable to each other in a further angular position of said second coupling member, different from said angular insertion/release position, by moving said second coupling member axially, from said predetermined axial position, in a second direction opposite said first direction, to define said lock position of said first and second coupling member;

said assembly further comprising:

stop means formed on said tubular first coupling member and defining an axial stop for said second coupling member in said further angular position, in which said third and fourth engaging elements are mutually engaged, wherein said stop means comprise a raised edge projecting radially inwards from a first axial end of said tubular first coupling member through which the second coupling member is inserted;

said second coupling member comprises at least one key projecting from a lateral surface at a first axial end of the second coupling member extending about said axis, said key comprising a first portion that has a contour defining said second engaging element, and a second portion that has a contour which defines said fourth engaging element lies radially and angularly within the contour of said first portion, and is located upstream from the first portion in said first direction;

said first engaging element comprises at least one first recess that has a contour formed in said raised edge of said tubular first coupling member and complementary to said first portion of said key; and said third engaging element comprises at least one second recess that has a contour which is formed in said raised edge of said tubular first coupling member, at a predetermined angular distance from said first recess about said axis, and is complementary in shape to said second portion of said key; and elastic means which are distinct from said sealing element, are interposed between a second axial end of said tubular first coupling member and a second axial end of said second coupling member and exert thrust on said second coupling member in said second direction.

2. An assembly as claimed in claim 1, wherein, when said second coupling member is in said further angular position and said second recess is engaged by said second portion of said key, said raised edge of said tubular first coupling member defines an axial stop for said first portion of the key.

3. An assembly as claimed in claim 2, wherein said elastic means are interposed between said second coupling member and a further raised edge projecting radially inwards from a portion of said tubular first coupling member and facing said raised edge.

4. An assembly as claimed in claim 2, wherein said second coupling member comprises two said keys on diametrically opposite sides of said axis, and wherein said tubular first coupling member comprises two said first recesses on diametrically opposite sides of said axis, and two said second recesses also on diametrically opposite sides of said axis and at predetermined angular distances from said first recesses.

5. A fastening assembly having a longitudinal axis, and comprising a tubular first coupling member coaxial with said axis, a second tubular coupling member insertable coaxially and at least partly inside said tubular first coupling member in a first direction, at least one sealing element interposed between an inner surface of said tubular first coupling member and an outer surface of said second coupling member, and fastening means that are releasable for locking said tubular first coupling member and said second coupling member to each other in a predetermined angular and axial lock position; said fastening means comprising:

a first and a second engaging element which are carried by said tubular first coupling member and said second coupling member, respectively, that are complementary in shape, engage with each other to define an angular insertion/release position in which to insert/release said second coupling member into/from said tubular first coupling member, and are releasable as a result of the positioning of said second coupling member in a predetermined axial position inside the tubular first coupling member; and a third and a fourth engaging element, which are carried by said first and second coupling member respectively, are complementary in shape, and are connectable to each other in a further angular position of said second coupling member, different from said angular insertion/release position, by moving said second coupling member axially, from said predetermined axial position, in a second direction opposite said first direction, to define said lock position of said first and second coupling member;

said assembly further comprising:

stop means formed on said tubular first coupling member and defining an axial stop for said second coupling member in said further angular position, in which said third and fourth engaging elements are mutually engaged, wherein said stop means comprise a raised edge projecting radially inwards from a first axial end of said tubular first coupling member through which the second coupling member is inserted;

said second coupling member comprises at least one key projecting from a lateral surface at a first axial end of the second coupling member extending about said axis, said key comprising a first portion that has a contour defining said second engaging element, and a second portion that has a contour which defines said fourth engaging element lies radially and angularly within the contour of said first portion, and is located upstream from the first portion in said first direction;

said first engaging element comprises at least one first recess that has a contour formed in said raised edge of said tubular first coupling member and complementary in shape to said first portion of said key; and said third engaging element comprises at least one second recess that has a contour which is formed in said raised edge of said tubular first coupling member, at a predetermined angular distance from said first recess about said axis, and is complementary in shape to said second portion of said key; and elastic means which are distinct from said sealing element and do not perform sealing action, are interposed between a second axial end of said tubular first coupling member and an second axial end of said second coupling member and exert thrust on said second coupling member in said second direction.

* * * * *